United States Patent [19]

Hokari et al.

[11] Patent Number: 4,661,757

[45] Date of Patent: Apr. 28, 1987

[54] CONTROLLER FOR AC ELEVATOR

[75] Inventors: Sadao Hokari, Katsuta; Takamasa Hori, Toukai; Katsu Komuro, Mito; Takanobu Hatakeyama, Nagareyama; Toshiroo Narita, Hitachi; Yasunori Katayama, Mito; Noboru Arahori, Katsuta, all of Japan

[73] Assignee: Hitachi, Ltd., Tokyo, Japan

[21] Appl. No.: 673,749

[22] PCT Filed: Mar. 7, 1984

[86] PCT No.: PCT/JP84/00090

§ 371 Date: Nov. 1, 1984

§ 102(e) Date: Nov. 1, 1984

[87] PCT Pub. No.: WO84/03486

PCT Pub. Date: Sep. 13, 1984

[30] Foreign Application Priority Data

Mar. 9, 1983 [JP] Japan ................................. 58-37463

[51] Int. Cl.[4] ......................... H02P 5/40; B66B 1/24
[52] U.S. Cl. .................................. 318/798; 318/806; 318/803; 318/812; 187/119; 307/64
[58] Field of Search ............... 318/801, 803, 798, 806, 318/810, 812, 813; 307/64; 187/29 AC

[56] References Cited

U.S. PATENT DOCUMENTS

| 3,753,069 | 8/1973 | Newton | 318/778 |
| 3,793,573 | 2/1974 | Tsuboi | 318/810 |
| 4,376,471 | 3/1983 | Uchino et al. | 307/64 |
| 4,454,930 | 6/1984 | Nomura et al. | 307/64 |

OTHER PUBLICATIONS

Andreas, J. C., *Energy-Efficient Electric Motors*, Dekker Inc., 1982, pp. 141-148.
Fisher et al., "Efficiency Spurs Adjustable Frequency Drive Use" Oct. 1975, p. 41+.

*Primary Examiner*—David Smith, Jr.
*Attorney, Agent, or Firm*—Antonelli, Terry & Wands

[57] ABSTRACT

In a controller for an AC elevator in which the frequency of AC power applied to a driving induction motor is varied by a frequency converter, the output frequency of the frequency converter when the elevator is running at its rated speed is at least as high as the frequency of the AC supply, and the AC supply is applied directly onto the induction motor without any frequency conversion during low-speed running, so that the elevator can be run slowly without using the frequency converter.

11 Claims, 8 Drawing Figures

CONTROLLER FOR AC ELEVATOR

DESCRIPTION

1. Technical Field

This invention relates to an AC elevator using an induction motor, and is particularly concerned with an apparatus suitable for providing low-speed running of an AC elevator in which an induction motor is controlled by a frequency converter.

2. Background Art

It is generally required that an elevator has the ability to run slowly when an abnormality occurs in its controller, or during maintenance. For example, if a motor-controlling thyristor is damaged, the elevator car is immediately stopped to ensure passengers' safety, but the car could stop between floors in this case. To rescue the passengers by moving a car which has stopped between floors to the nearest floor, a slow-running function is necessary. Because of this requirement, the low-speed running must be realizable even when a thyristor has failed, etc.

U.S. Pat. No. 4,319,665 is known, as an example of a controller for an AC elevator. In this system, a three-phase induction motor which has a high-speed winding and a low-speed winding is used, a primary voltage impressed on the high-speed winding during operation is controlled, and a DC current supplied to the low-speed winding during damping is also controlled to provide normal operation. In such a system, it is known that slow-running can be obtained by supplying AC power to the low-speed winding when, for example, a thyristor or the like controlling the primary voltage is damaged.

However, the conventional system requires low-speed and high-speed windings for the motor which increases the size of the structure and also its cost, and recent requirements for power saving and increased performance have made it necessary to change this system.

A method of using a frequency converter has been known for a long time as a system for controlling an induction motor at a reduced power consumption and increased performance is disclosed in, for example, U.S. Pat. No. 3,940,669.

It has been proposed recently that the above requirement is realized by controlling the elevator-driving induction motor by means of a frequency converter, as disclosed in British Patent Laid-Open No. 2,081,534. The frequency converter in this case is used in a system in which a frequency is converted directly between alternating currents, or a system in which an alternating current is first converted into a direct current (by a converter) and is then inverted to form an alternating current of a variable frequency (by an inverter), or a system in which only the inverter is provided, when the supply is a direct current. Any of these systems has the potential to satisfy the requirements for power saving, increased performance, and a single winding for the motor, compared with the conventional system described above.

However, such an AC elevator using a frequency converter will still have to be run slowly after the elevator car is stopped because, for example, the frequency converter has been damaged. In addition, the ability to run slowly without using the frequency converter is necessary during maintenance.

Consequently, even an AC elevator using a frequency converter must either be provided with an apparatus for low-speed running or, for example, a low-speed winding or a small motor for low-speed running. This means that a large structure and increased cost cannot be avoided with the slow-running apparatus.

DISCLOSURE OF THE INVENTION

An object of the present invention is to provide a controller for an AC elevator using a frequency converter, which is capable of running slowly but which has a simple, inexpensive construction.

The invention is characterized in that the output frequency of the frequency of the frequency converter at the rated speed of the elevator is set to be at least the frequency of the AC power, the AC power is then impressed on the induction motor directly as a power frequency during slow running, so that slow running determined by the AC power frequency is provided.

BRIEF DESCRIPTION OF DRAWINGS

FIG. 1 to FIG. 7 are drawings of one preferred embodiment of the present invention, wherein FIG. 1 is a general block diagram of an AC elevator controller, FIG. 2 is a circuit block diagram of a control signal generator, FIG. 3 is a graph of the frequency command characteristic for the inverter, FIG. 4 is a graph of the relationship between frequency and voltage in the inverter, FIG. 5 is a graph of the torque characteristic of the elevator car-driving induction motor, FIG. 6 shows a speed curve of the elevator, FIG. 7 is a circuit diagram of a voltage reduction unit.

BEST MODE FOR CARRYING OUT THE INVENTION

Embodiments of the present invention will now be decribed in detail with reference to the accompanying drawings.

Figure 1:
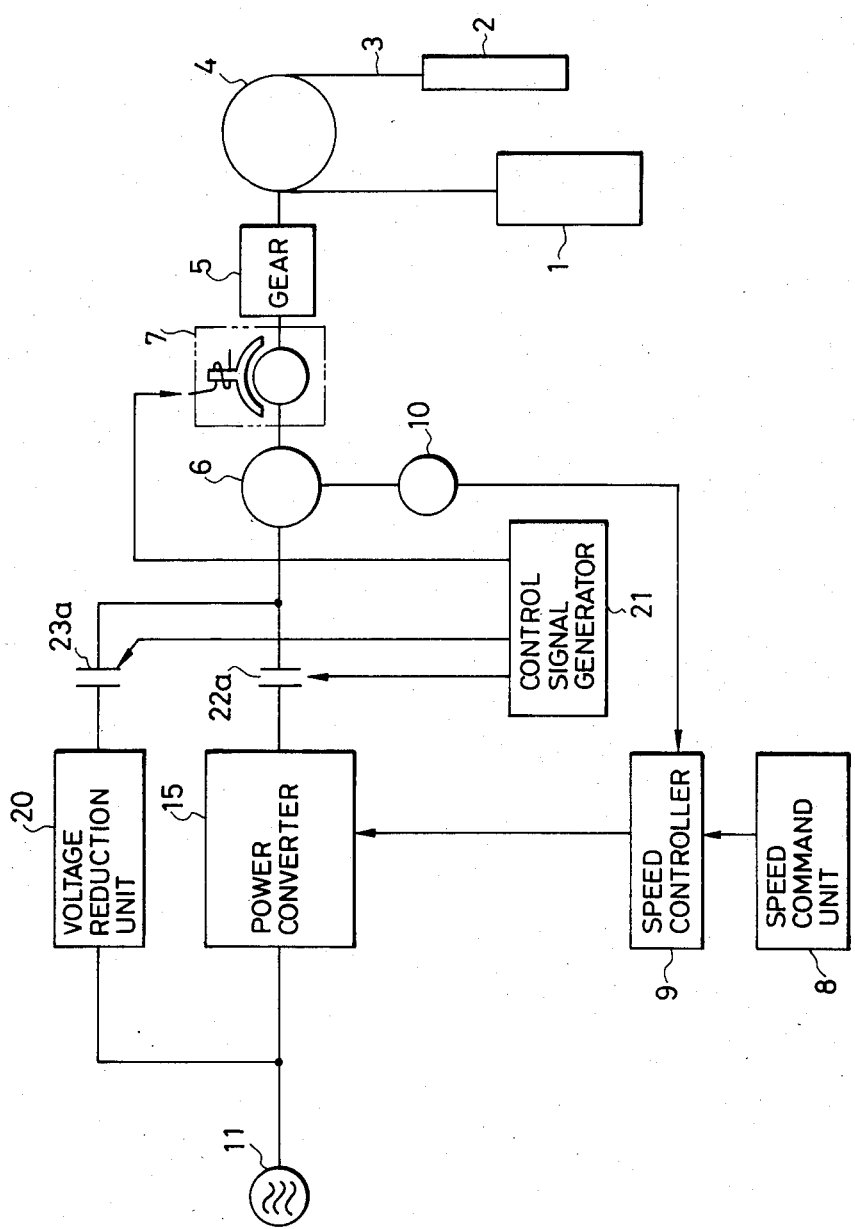

FIG. 1 shows an AC elevator controller given as one preferred embodiment of this invention.

In the drawing, a car 1 and a counterweight 2 are hung over a sheave 4 like well buckets on a rope 3, and an elevator-driving induction motor 6 is connected to the sheave 4 by a reduction gear 5. A solenoid brake 7 is connected to a rotary shaft of the motor 6, and brakes and holds the car 1 by frictional force according to commands from a control signal generator 21.

A power converter 15 inputs three-phase AC power 11, is controlled by a speed controller 9 according to speed commands from a speed command unit 8 and detected speed from a speed detector 10, and controls the frequency and the voltage or current supplied to the induction motor 6. Since the power 11 is AC power, the power converter 15, as is well known, first converts the AC power into DC power in a converter, and then converts it into AC power of variable frequency by an inverter. The inverter could be voltage inverter or a current inverter, either can be employed therefor. The power converter 15 will be referred to simply as the "inverter" hereafter, and the case in which a voltage inverter is chiefly used will be described.

Reference numeral 20 denotes a voltage reduction unit which reduces the voltage applied to the induction motor 6 during slow running, and which is constituted, for example, of a transformer or an impedance element or the like.

Figure 2:
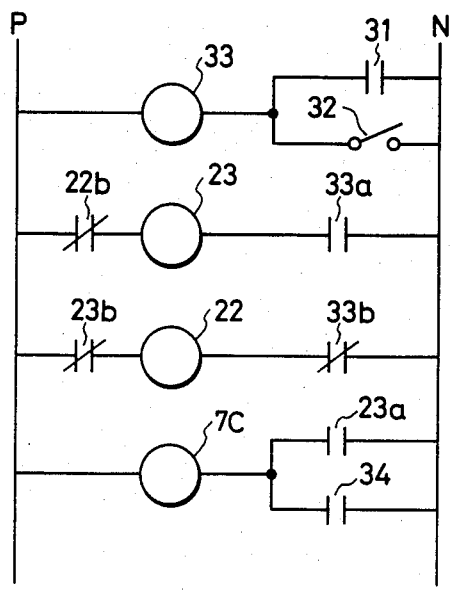

Reference numeral 21 denotes a control signal generator which closes a contactor 22a during high-speed running and also closes a contactor 23a during low-speed running, and one example thereof is illustrated in FIG. 2.

In FIG. 2, a high-speed running relay 22 is usually excited, and the contacts 22a of FIG. 1 are closed. When a low-speed running command relay 33 is excited, contacts 33b are closed, and contacts 33a are closed to excite a low-speed running relay 23, so that the low-speed running contactor 23a is closed to change the operation over to low-speed running. In this case, a brake coil 7c is also excited and releases the solenoid brake 7 to provide low-speed running. The low-speed running command relay 33 is excited by the closing of contacts 31 when relief running is required because of abnormality in the inverter 15 or the speed controller 9, or by the closing of low-speed running request command contacts 32 during maintenance running. Reference numeral 34 denotes brake command contacts for normal running.

Accordingly in FIG. 1, the AC power 11 is supplied to the induction motor 6 through the inverter 15 by the closing of the contactor 22a during normal running or high-speed running. Thus the induction motor 6 is operated by power of a frequency f and a voltage V supplied by the inverter 15, and the elevator car 1 is driven thereby through the reduction gear 5 and the sheave 4.

The speed detector 10 mounted on the induction motor 6 returns a speed signal proportional to the rotational speed of the induction motor 6 to the speed controller 9.

Figure 3:
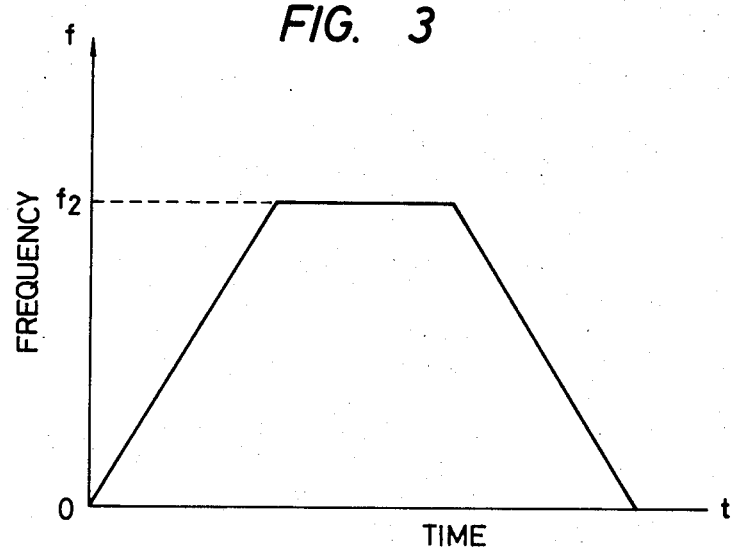
Figure 4:
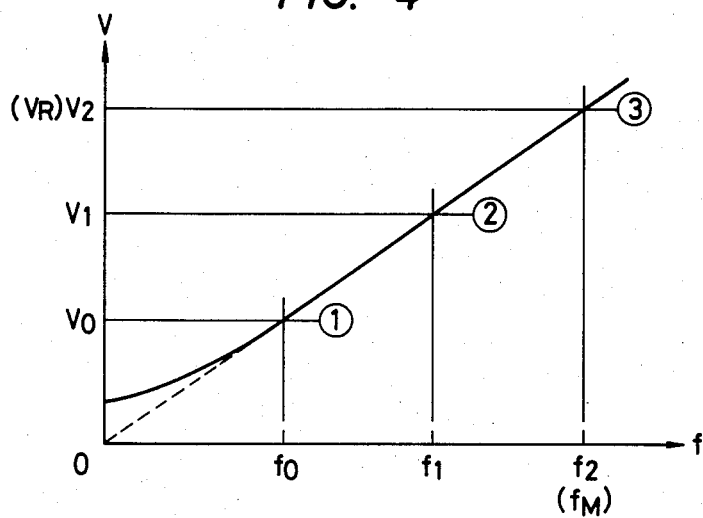
Figure 5:
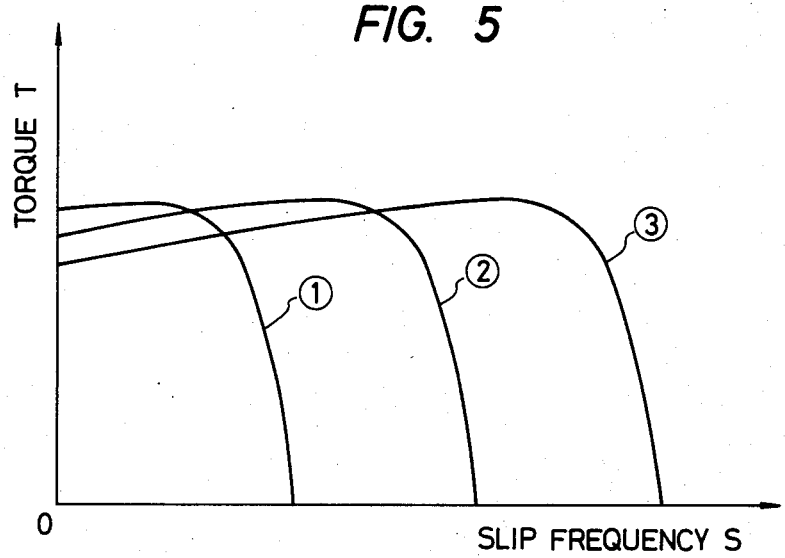

With such a constitution, when the elevator is accelerating, the solenoid brake 7 is released by the control signal generator 21, and the speed controller 9 controls the output frequency as shown in FIG. 3. The frequency is increased from zero to a frequency $f_2$ corresponding to the rate speed of the elevator, a slip frequency with respect to a speed feedback signal is obtained, and a signal which generates a predetermined torque from the slip frequency and a voltage command is supplied to the inverter 15. The voltage command generates a signal such that the ratio v/f is kept virtually constant, as shown in FIG. 4. The reason for this is to keep the internal magnetic flux of the induction motor 6 constant, so as to obtain a torque characteristic moving parallel to the supply frequency, thus generating the torque efficiently. That is, by changing the relationship between frequency and voltage as at ①, ②, or ③ of FIG. 4, the torque characteristic of the motor 6 becomes ①, ②, or ③ of FIG. 5 to provide a parallel-moving characteristic.

Thus, the acceleration of the elevator car 1 is controlled by supplying to the inverter 15 a signal which generates a predetermined torque in the motor 6, from the frequency f and the voltage V.

In this case, the frequency $f_2$ providing running at the rated speed is set to be higher than the frequency $f_R$ of the AC power 11, so that the relationship between $f_2$ and $f_R$ is:

$$f_2 \geq k \cdot f_R (k>1) \quad (1)$$

where k is a value indicating the ratio of rated running speed during high-speed running to speed during low-speed running.

Regenerative torque is generated by decreasing the frequency command for $f_2$ to $f_2=0$ in the speed controller 9, as shown in FIG. 3, thus decelerating the elevator car 1. When the elevator car 1 has been decelerated, the control signal generator 21 releases the brake 7, thus stopping the elevator car 1.

Figure 6:
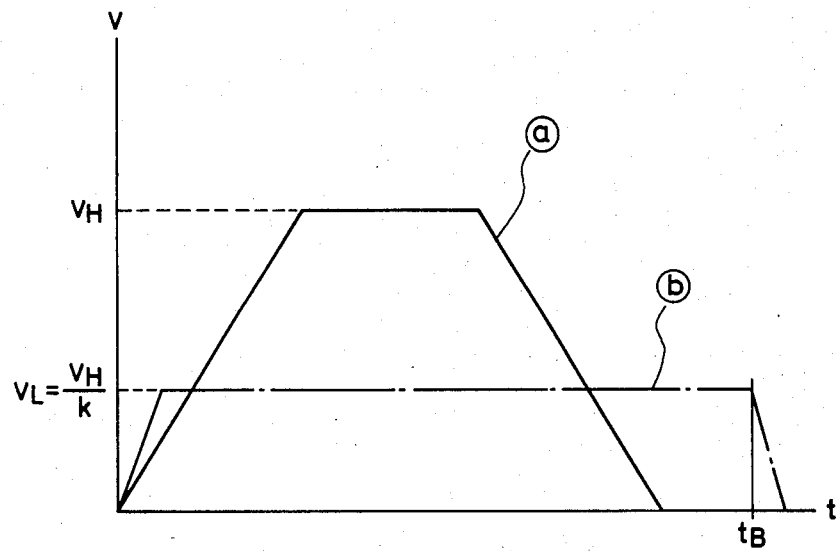

The velocity of the elevator car 1 has a characteristic based on the frequency command f of FIG. 3 during high-speed running ⓐ, as shown in FIG. 6, and its velocity $v_H$ at during rated-speed running is:

$$v_H = \frac{D}{2} \cdot \frac{2\pi}{60} \cdot \frac{120 f_2}{P} \cdot \frac{1}{i} \text{ (m/min)} \quad (2)$$

where D(m) is the diameter of the sheave 4, P is the number of poles of the induction motor 6, and i is the deceleration ratio of the reduction gear 5.

On the other hand, when the elevator is run slowly for maintenance or when the inverter 15 has failed, the contactor 22a is opened, the contactor 23a is closed, and the brake 7 is released, as described above.

Accordingly, the AC power 11 is supplied to the induction motor 6 through the voltage reduction unit 20.

The velocity $v_L$ of the elevator car 1 during this time is lower than its velocity $v_H$ during high-speed running ⓐ, as shown in FIG. 6 ⓑ, and is given by:

$$v_L = \frac{D}{2} \cdot \frac{2\pi}{60} \cdot \frac{120 f_R}{P} \cdot \frac{1}{i} \text{ (m/min)} \quad (3)$$

From equations (1), (2) and (3):

$$v_L = \frac{1}{k} \cdot v_H$$

so that it is kept running at a low speed which is 1/k of the rated speed.

When it reaches the desired floor (at $t_B$ in FIG. 6, for example), the relief-running request contacts 31 of the control signal generator 21 are opened, so that the low-speed running command relay 33, the low-speed running relay, and the brake coil 7c are demagnetized. Accordingly, the brake 7 is released and the contactor 23a is opened, thus stopping the elevator car 1.

In FIG. 4, a voltage almost the same as the supply voltage $V_R$ of the AC power 11 is maximized, so that a voltage $V_2$ corresponding to the frequency $f_2$ is set at $V_2 = V_M$, where the rated voltage of the induction motor 6 is $V_M$.

Consequently, magnetic flux saturation of the motor 6 could be generated by the application of the supply voltage $V_R$ at the frequency $f_R$ ($<f_2$) of the AC power 11, so that the primary current required for obtaining the same torque characteristic will increase.

Therefore, the voltage applied to the motor during low-speed running must be adjusted to $V_R/k$ relative to the speed ratio k, to keep the ratio V/f constant.

The constitution of this embodiment is such that the voltage $V_R/k$ is applied to the induction motor 6 by the voltage reduction unit 20 during low-speed running.

As described above, the elevator can be run at a low velocity $V_L$ which is 1/k of the rated velocity $V_H$ by supplying the frequency $f_R$ and the voltage $V_R/k$ to the motor 6.

The voltage stepped down by the voltage reduction unit 20 is not sufficient to generate magnetic flux saturation in the motor 6, so that it can be set to be within a range that will enable a torque satisfactory for low-speed running, and hence the voltage reduction unit 20 is not required if the motor 6 has a large capacity.

The voltage reduction unit 20 can be constituted of a control element such as a thyristor, transistor, or the like, instead of the impedance element such as a transformer, resistor, or the like, described above.

Figure 7:
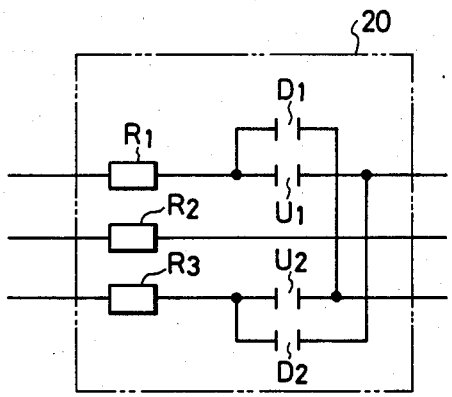

The configuration of the voltage reduction unit 20 can be as shown in FIG. 7, to provide a free determination of the direction in which the elevator runs during low-speed running. In FIG. 7, reference characters $R_1$ to $R_3$ denote resistors for voltage reduction, and the polarity impressed on the induction motor 6 is transferred by ascending contactors $U_1$, $U_2$ and descending contactors $D_1$, $D_2$. Since the direction of running of the elevator can be selected freely, the passengers can be moved quickly toward the nearest floor during relief running and, after relief running, the service can maintained by controlling the contactors $U_1$, $U_2$ and $D_1$, $D_2$ until the inverter 15 and other parts are repaired. In this case, smoother running of the elevator can be obtained by making the resistances of the resistors $R_1$ to $R_3$ variable, or controlling the voltage by thyristors or the like.

The control signal generator 21 and other parts have been described as relay circuits, but the relay circuits can be omitted by processing the operations thereof by an elevator-controlling microcomputer.

The elevator can be run slowly during maintenance by the frequency converter 15, but by the power frequency alone when an abnormality has arisen in the frequency converter 15, so that the low-speed running condition can be changed in various ways according to the type of the elevator.

Figure 8:
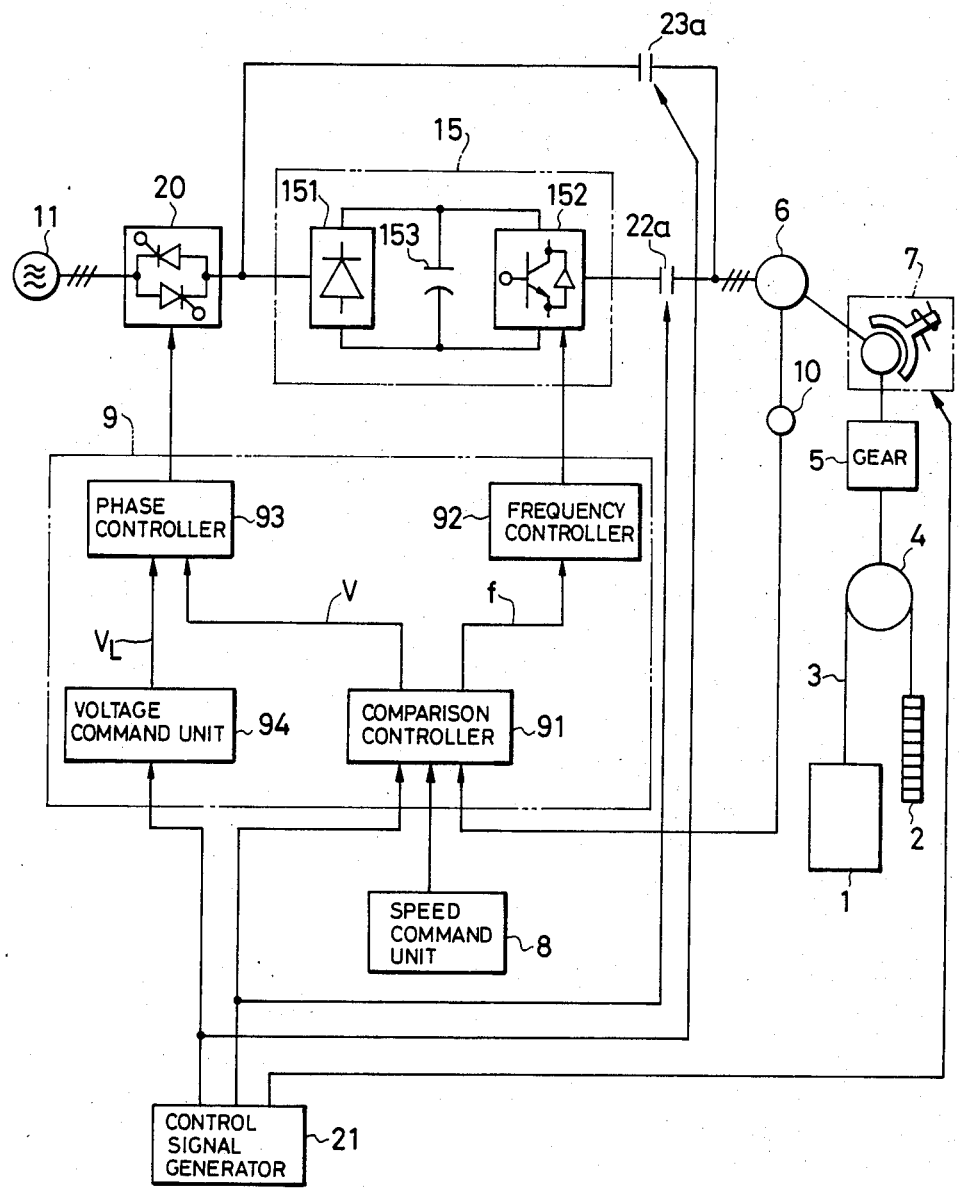
FIG. 8 is a block diagram of another embodiment of the AC elevator controller according to the present invention.

FIG. 8 shows another embodiment of this invention, wherein the voltage reduction unit 20 is constructed so that it is able to control the voltage by a thyristor.

In the drawing, the same reference characters denote parts identical to those in FIG. 1, and hence no further description will be given thereof, but this embodiment is characterized in that the voltage reduction unit 20 and the frequency converter 15 are connected in series.

The frequency converter 15 consists of a converter 151, an inverter 152, and a smoothing capacitor 153. To control the output voltage, the converter 151 is usually constituted of a full-wave rectifying bridge using a thyristor. In this embodiment, the voltage control function of the converter 151 is realized by the voltage reduction unit 20 provided on the supply side thereof, enabling a simplification of the converter 151. The converter 151 can be constituted simply of a full-wave bridge circuit consisting of a diode.

In accordance with this modification, the speed controller 9 normally inputs a speed command from the speed command unit 9 and a feedback speed from the speed detector 10, obtains a voltage signal V and a frequency signal f from a comparison controller 91, and controls the voltage reduction unit 20 and the inverter 153 by a phase controller 93 and a frequency controller 92, respectively. Thus, the AC power supplied to the induction motor 6 is controlled according to the relationship between voltage and frequency, and the running of the elevator car 1 is controlled.

Next, when low-speed running is commanded by the control signal generator 21, the high-speed running contactor 22a is opened, as described before, to disconnect the frequency converter 15, and the low-speed running contactor 23a is closed to supply the AC output of the voltage reduction unit to the induction motor 6. At the same time, the control provided by the comparison controller 91 is stopped by a signal from the control signal generator 21, and a voltage command unit 94 is actuated. A voltage command $V_L$ from the voltage command unit 94 to the phase controller is set, in the same way as in the previous embodiment, to:

$$V_L = V_R/k$$

where $V_R$ is the voltage of the AC power 11. Accordingly, the induction motor 6 is supplied by the voltage reduction unit 20 during low-speed running, in the same way as in the previous embodiment, and the car 1 can be run at a speed which is $1/k$ of the rated velocity.

Since the voltage reduction unit 20 is constructed of reverse-parallel connected thyristors inserted into at least one phase between the AC power 11 and the frequency converter 15, the speed of the induction motor 6 can be controlled, in the same way as in conventional primary voltage control, by controlling the phase by the phase controller 93. That is, the car 1 can be run smoothly even during low-speed running.

In this embodiment, when the voltage reduction unit 20 fails, the car 1 cannot run. However, it is considered that the voltage reduction unit 20 has a high degree of reliability because of its simple construction and reduced number of components, compared with the frequency converter 15. Therefore, the probability of the voltage reduction unit 20 failing is very low, and hence problems are minimized in practice. Should the voltage reduction unit 20 fail, despite this, it is short-circuited, so that running is enabled only by the frequency converter 15. In this case, the output voltage of the frequency converter 15 cannot be controlled, but relief running of the car 1 for a short time to the nearest floor should raise no problems.

As described above, according to the present invention, low-speed running can be realized simply by applying AC power directly, as a power frequency, onto an elevator-driving induction motor. Accordingly, the apparatus has a simple construction, compared with that in which a low-speed running motor winding or the like is used, and an economical effect results therefrom.

What is claimed is:

1. A controller for an AC elevator provided with an elevator car running past a plurality of floors comprising:
    an AC source for producing AC power of a fixed voltage and a fixed frequency;
    an induction motor for driving said elevator care;
    frequency converter means for varying, in accordance with a speed command, the frequency of the AC power supplied from said AC source and applied to said induction motor so that the output frequency of said frequency converter means during rated-speed running of said elevator car is set to be higher than the fixed frequency of said AC source;
    voltage reduction means for supplying, for said induction motor, the AC power of the same frequency as the fixed frequency of said AC source, and a reduced voltage lower than said fixed voltage of said AC source; and switching means for changing the AC power supplied for said induction motor from the output of said frequency converter means to the output of said voltage reduction means, when a low-speed running command is issued.

2. The controller for an AC elevator as defined in claim 1, wherein an applied frequency $f_2$ from said frequency converter during rated-speed running is set to be within:

$$f_2 \geqq k \cdot f_R$$

where:
k: ratio of rated speed to low-speed running speed
$f_R$: AC supply frequency.

3. The controller for an AC elevator as defined in claim 1, wherein said voltage reduction means is inserted between said AC source and said frequency converter means, and said switching means disconnects the output of said frequency converter means and applyies the output of said voltage reduction means to said induction motor when a low-speed running command is issued.

4. The controller for an AC elevator as defined in claim 3, wherein said voltage reduction unit comprises reverse-parallel connected thyristors inserted into at least in one phase between said AC supply and said frequency converter, and is provided with a means for controlling the phase of said reverse-parallel connected thyristors when a low-speed running command is issued.

5. The controller for an AC elevator as defined in claim 3, wherein said voltage reduction means comprises reverse-parallel connected thyristors inserted into at least in one phase between said AC source and said frequency converter means, said frequency converter means consists of a full-wave rectifying bridge circuit for rectifying AC power from said voltage reduction means, and an inverter for converting a DC output of said full-wave rectifying bridge circuit into AC power of variable frequency.

6. The controller for an AC elevator as defined in claim 5, wherein an output voltage of said voltage reduction means and an output frequency of said inverter are controlled according to a speed command for said elevator car and a feedback speed for said motor during rated-speed running of said elevator car.

7. The controller for an AC elevator as defined in claim 1, wherein an output voltage V of said voltage reduction means is set to:

$$V \doteq V_R / k$$

where:
$V_R$: AC source voltage
k: ratio of rated speed to low-speed running speed.

8. The controller for an AC elevator as defined in claim 1, wherein said AC source is applied to said induction motor by an apparatus whereby the polarity thereof is changed according to the direction in which said elevator car runs.

9. The controller for an AC elevator as defined in claim 1, wherein said low-speed running is commanded when an abnormality occurs in said frequency converter means.

10. The controller for an AC elevator as defined in claim 1, wherein said low-speed running is commanded during relief running of said elevator car.

11. The controller for an AC elevator as defined in claim 1, wherein said low-speed running is commanded during maintenance running of said elevator car.

* * * * *